United States Patent [19]

Hallett

[11] Patent Number: 4,819,571
[45] Date of Patent: Apr. 11, 1989

[54] PROCESS FOR THE DESTRUCTION OF ORGANIC WASTE MATERIAL

[75] Inventor: Douglas J. Hallett, Acton, Canada

[73] Assignee: Eli-Eco Logic Inc., Rockwood, Canada

[21] Appl. No.: 82,452

[22] Filed: Aug. 5, 1987

[30] Foreign Application Priority Data

Aug. 8, 1986 [CA] Canada .................................. 515603

[51] Int. Cl.⁴ .............................................. F23G 7/00
[52] U.S. Cl. .................................. 110/346; 110/214; 110/237; 110/238; 110/250
[58] Field of Search ............... 110/235, 237, 238, 250, 110/346, 345, 208, 210, 211, 214, 215, 216

[56] References Cited

U.S. PATENT DOCUMENTS

| | | | |
|---|---|---|---|
| 4,230,053 | 10/1980 | Deardorff et al. | 110/346 |
| 4,316,878 | 2/1982 | Akune et al. | 110/238 X |
| 4,463,691 | 8/1984 | Meenan et al. | 110/346 |
| 4,474,121 | 10/1984 | Lewis | 110/346 |
| 4,481,891 | 11/1984 | Takeshita et al. | 110/238 |
| 4,628,837 | 12/1986 | Mori et al. | 110/346 |
| 4,631,183 | 12/1986 | Lalancette et al. | 110/237 X |
| 4,655,968 | 4/1987 | Quieser et al. | 110/250 X |

FOREIGN PATENT DOCUMENTS

| | | | |
|---|---|---|---|
| 21916 | 2/1984 | Japan | 110/346 |
| 232947 | 12/1984 | Japan | 110/237 |

Primary Examiner—Steven E. Warner
Attorney, Agent, or Firm—Blake, Cassels & Graydon

[57] ABSTRACT

A system for the destruction of organic waste material such as halogenated organic compounds, e.g., PCB's and related waste organic matter, comprises subjecting the waste material to reduction with a gaseous reducing agent, preferably hydrogen, at a temperature above about 600° C. and thereafter subjecting the hot reaction mixture thus obtained to oxidation with a gaseous oxidizing agent at a temperature above about 1000° C. The combined reduction followed by immediate oxidation is effective in achieving substantially complete breakdown of the halogenated compounds to substantially non-noxious gases. The system includes a reduction vessel wherein hydrogen is used directly in intimate mixing relation with the pulverized waste material, and after completion of a residence time sufficient to reduce the organic compounds, the gaseous by-products pass to an adjacent combustor for oxidation therein.

45 Claims, 3 Drawing Sheets

PROCESS FOR THE DESTRUCTION OF ORGANIC WASTE MATERIAL

BACKGROUND OF THE INVENTION

This invention relates to a system for the destruction of organic waste material and more particularly it relates to a process for the destruction of organic waste material which may or may not contain polyhalogenated waste material, and to apparatus for carrying out the process.

It is known to destroy halogenated organic waste material by reduction procedures using, for example, sodium metal or sodium napthalide. It is also known to destroy halogenated organic waste material by oxidation, using, for example, high temperature incineration. These known processes have certain limitations or disadvantages in that they can only be used for particular kinds of waste material. Moreover, the chemical reagents used for the destruction are sometimes hazardous to handle and the destruction may lead to the formation of highly toxic by-products.

The dimensions of the problem relating to the disposal of polyhalogenated liquids, particularly polychlorinated biphenyls (known generally, and to the public as PCB's) and associated wastes has been reviewed in the Environment Canada Economic and Technical Review Report EPS 3-EC-83-1. Bearing in mind the suspected carcinogenic nature of PCB's and the apparent absence of degradation in nature, over extremely long time periods, the identified quantities of PCB's presently in use in electrical transformers and capacitors (Table 7 of the Report), comprising a mass value of 14.8 million kilograms, conveys some idea of the scale of the problem.

Furthermore, the accumulation of these materials in numerous localities, mostly remote from the existing large-scale incinerators available in the United States and Canada for disposal purposes further emphasizes the extreme nature of the problem. Public awareness to the potential danger of PCB's to public health also further complicates the situation in precluding transportation thereof to existing combustion facilities. The occurrence of certain, well-publicized, PCB spills has further exacerbated this aspect of the problem.

The existing method of disposing of these types of substance has been by incineration, in large installations. While claims have been made to the achievement of very high percentile effectiveness of disposal by this method, there is concern that the reports may prove less than valid, on a long-term, continuing basis. In addition incineration or oxidation will form highly toxic by-products such as chlorinated dioxins if operated outside of exact optimal temperatures and residence time requirements.

One identified problem, referred to at Page 28 of the above-noted Report, which contributed to the demise of the related PCB incinerator, was the formation of a ring of "agglomerated material" during incineration. This type of "glop" formation may well be a characteristic by-product of incineration systems, and possibly is indicative of partial recombinations of molecules into ring compounds of a suspect type. This constitutes a further reason for providing a changed process.

Pyrolysis or starved air thermal destruction or degradation of solid and liquid organic waste products of hydrocarbons has previously been hampered by the formation of tars and polynuclear aromatic hydrocarbons containing from one to five aromatic rings. This invention includes the addition of gaseous reducing agents, particularly hydrogen, in concentrations sufficient to saturate or reduce the molecules produced such that aromatic and polyaromatic structures are eliminated as by-products of the intended reaction.

SUMMARY OF THE INVENTION

We have now found that organic waste material can be destroyed efficiently and completely by use of a process which combines a gas phase chemical reduction in a reducing atmosphere at a high temperature followed by oxidation of the hot reaction mixture from said chemical reduction in a high temperature incinerator.

Thus, according to the invention, as claimed herein, we provide a process for the destruction of organic waste material which comprises subjecting said waste material to chemical reduction with a gaseous reducing agent at a temperature above about 600° C. and thereafter subjecting the hot reaction mixture thus obtained to oxidation with a gaseous oxidizing agent at a temperature above about 1000° C.

As a further feature of the invention, as claimed herein, we provide a process for the destruction of organic waste material which comprises subjecting the waste material to reduction with a gaseous reducing agent at a temperature of from about 700° C. to about 900° C., the reduction being effected over a residence time of from about 5 seconds to about 40 seconds and thereafter subjecting the hot reaction mixture thus obtained to oxidation with a gaseous oxidizing agent at a temperature of from about 1000° C. to about 1400° C., the oxidation being effected over a residence time of from about 1 second to about 4 seconds.

The process of this invention may, for example, be conveniently carried out by the direct injection of organic waste material, for example, halogenated organic waste material in the form of a liquid, a pumpable sludge, a fine particulate slurry such as contaminated sediment/water mixtures, or a pulverized solid, upwardly into a pressurized reaction vessel, in the absence of oxygen. The reaction vessel is heated and maintained at temperatures above about 600° C., preferably at a temperature of from about 700° C. to about 900° C.

The waste may be co-injected with a gaseous reducing agent such as hydrogen, gaseous ammonia, natural gas, methane, propane or water vapor, or a mixture of such reducing agents. The reduction may be carried out with or without the addition of a metal catalyst such as iron, zinc, tin or nickel in the form of iron filings or powdered zinc, tin or nickel which may be co-injected into the vessel to promote the reduction reaction.

However, the preferred system embodiment comprises the steps of co-injecting (on a continuous basis) the waste, with hydrogen, into a preheated reduction vessel, maintaining the vessel at an internal pressure above atmospheric, up to one atmosphere above ambient, without the addition of catalyst materials.

The reaction vessel can be arranged and the rate of injection may be adjusted, such that the residence time of gaseous material in the reduction vessel is greater than about 5 seconds and preferably from about 15 seconds to about 45 seconds. A particularly effective residence time in which to effectively complete the reduction is about 30 seconds.

The reduction may be carried out at a temperature of from about 600° C., to about 1100° C., preferably within the range of from about 700° C. to about 900° C. and particularly at a temperature of from about 800° C. to about 900° C.

The reduction may also be carried out in the presence of a metal, such as an iron, nickel, zinc or tin catalyst. The catalyst may be in the form of iron filings, powdered nickel, powdered zinc or powdered tin.

The organic waste material may or may not contain organic compounds such as halogenated biphenyls, halogenated benzenes, halogenated phenols, halogenated cycloalkanes, halogenated alkanes, halogenated dioxins and halogenated dibenzofurans. For example, the organic waste material may contain commonly used chlorinated organic compounds such as chlorinated biphenyls, also known as polychlorinated biphenyls (PCB's), chlorinated benzenes, chlorinated phenols, chlorinated cycloalkanes, chlorinated alkanes, chlorinated dioxins and chlorinated dibenzofurans.

The organic waste material may be in the form of a liquid, a pumpable sludge, a fine particulate slurry such as contaminated sediment/water mixtures, or a pulverized or shredded solid such as contaminated wood waste or soils. Such waste material may include, for example, oils containing polychlorinated biphenyls (PCB's) as waste products from capacitor and transformer manufacturing processes, or from obsolete electrical or non-electrical equipment, and products used in various industries as plasticizers, hydraulics fluids and lubricants.

The organic waste material may also be such that it contains non-halogenated organic compounds. It may, for example, be in the form of shredded or particulate organic solid material, such as shredded pathogenic waste material.

The reaction vessel for the reduction stage of the process is lined with suitable chemical and thermal resistant materials to withstand gaseous by-products generated, such as hydrogen halides, for example, hydrogen chloride. It also is fitted with a clean-out auger to remove solid debris or by-products, such as metals, metal salts, silicates or other solid matter, which accumulates in the vessel.

While gaseous reducing agents such as gaseous ammonia are less costly and also potentially less explosive than hydrogen, methane or propane, certain advantages are obtained with these latter reducing agents. However, while the use of gaseous hydrogen is preferred for a number of reasons, it is contemplated that propane may be used if the BTU content of the waste is potentially too low for proper oxidation to take place.

However, the use of a reducing vessel and selection of gaseous hydrogen as the reducing agent has many beneficial and optimizing effects. Thus, in the case of one embodiment, a road-mobile system for the on-site destruction of accumulated PCB's, the utilization of hydrogen minimizes the necessary size of the reducing vessel for carrying out a continuous process and the potential for production of carbon. Reduction of PCBs or hazardous waste to gaseous fuel further reduces the necessity of additional fuel and the additional required combustion air for the fuel, therefore greatly reducing the size of the secondary incinerator and overall destruction apparatus.

The safety requirements for the reduction vessel involve the use of a multiple purge by inert gas, such as nitrogen, to ensure the absence of oxygen (by way of air) within the vessel, so as to preclude the likelihood of explosion. As the process is generally proposed to be a continuous process, the purging requirement becomes proportionately less onerous.

In the preferred embodiment, having the reduction vessel directly connected with the combustor, both of the vessels are initially thus purged.

In view of the desirability of operating the reduction vessel directly adjacent to, and preferably in direct connection with a high temperature oxidizing zone (the combustor), the reduction zone is maintained at a pressure sufficiently higher than that within the combustor as to warrant no flow-back of oxidizing agents, including air, from the combustor, into the reduction vessel. Furthermore, the arrangement of the reduction zone has the mixing nozzles, wherein the pressurized reducing gas mixes intimately with and atomizes the incoming waste by high velocity impact therewith, located at a low level within the zone, and a gaseous residence zone containing reduced gaseous products located thereabove, so as to isolate the reduction zone from the outlet to the oxidation zone. This interface zone between reduction and oxidation may include a ceramic firestop to prevent flash backs. The hot reduced gas is introduced into the oxidation zone through a combustion mantle, combustion nozzles or suitable apparatus to allow adequate mixing with the combustion air introduced into the oxidation zone and to allow optimal positioning of the flame front within the oxidation chamber.

A further advantage of utilizing hydrogen, generally in gaseous form, is the capability of utilizing a jet or jets of hydrogen in impacting relation with the substances being reduced, so as to achieve a highly active mixing zone wherein the as-supplied state of the hydrogen is utilized in order to optimize the mixing efficiency, and the reduction process.

In the case of fluid waste, a jet of the waste can be impacted by a transversely directed jet of hydrogen, to effect atomization with intimate mixing, to promote the chemical effectiveness of the reduction process.

One embodiment incorporates the use of a radially inward gas cross-flow nozzle of the CALDYN (TM) type. The subject system is capable of handling fluid waste incorporating particles up to one-quarter inch mesh size therein, and droplets sized down to as small as forty microns (40) can be economically obtained.

It is to be understood that the reduction may also be carried out in the presence of water vapor which does not inhibit the reduction reaction. Thus, it is possible to destroy organic waste material, sludges or sediments, such as contaminated harbour sludges or sediments, containing substantial quantities of water.

The hot reaction mixture from this reduction procedure will generally be dehalogenated, hydrogenated or reduced hydrocarbons or substantially dehalogenated hydrocarbons together with hydrogen halide, such as hydrogen chloride, water and excess hydrogen.

The reaction vessel to be used for the reduction in a preferred embodiment is vertically interfaced with a second vessel to be used for the second, oxidation phase. The hot reaction mixture from the reduction stage, at a temperature of from about 600° C. to about 1000° C., and more particularly from about 800° C. to about 900° C., may be forced through a short insulated ceramic or refractory lined tube by convection and the pressure created as a result of evaporation and volatilization of the injected liquid or partially liquid waste together with continuous expansion of the gases as the reduction breakdown occurs. Excess air or oxygen can be introduced into the second vessel in such a way as to create a turbulent flow of hot gases of the hot reaction mixture together with oxygen which will promote the complete combustion of those gases at a temperature of above about 1000° C. Particularly useful temperatures are those within the range of about 1000° C. to about 1500° C. and especially a temperature of from about 1200° C. to about 1400° C.

The size of the second vessel for the oxidation procedure may be such that the retention or residence time of the hot reaction mixture in the combustion chamber will be from about 1 second to about 4 seconds, preferably for a residence time of about 2 seconds, or more. The combustion chamber of the second vessel may also be lined with suitable material to withstand the hot acidic gases, such as hydrogen chloride, which will pass through it. The hot emission from this second vessel is then rapidly cooled and scrubbed with water and aqueous alkali such as sodium hydroxide mist or sodium carbonate in order to remove and neutralize the acidic gases.

The invention is illustrated in principle by, but not limited to, the following examples:

EXAMPLE 1

1 Molar equivalent of polychlorinated biphenyl (Arochlor*1248) was reacted with 22 molar equivalents of hydrogen in a first reaction chamber at a temperature of 875° C. and 1 atmosphere gauge during a reaction period of about 30 seconds. This reaction produced 99.9% destruction and the gaseous reaction mixture thus obtained contained hydrogen chloride, benzene, biphenyl and chlorobenzenes. This gaseous reaction mixture was then passed through an interfacing tube at 875° C. into a second reaction chamber where oxidation could take place. A 5% excess of preheated air was then mixed with the gaseous reaction mixture in the second reaction chamber and oxidation was completed at a temperature of 1000° to 1200° C. during a residence time of 2 seconds. This oxidation of the gaseous reaction mixture was effective in completing oxidation of the remaining reactants in the mixture.

TM

EXAMPLE 2

9 Molar equivalents of monochlorobenzene and 2 molar equivalents of 1,2,4-trichlorobenzene were reacted with 21 molar equivalents of hydrogen in a first reaction chamber at a temperature of 925° C. and 1 atmosphere pressure during a reaction time of 30 seconds. The reaction produced 99.95% dehalogenation of the chlorobenzenes. This gaseous reaction mixture was then passed through an interfacing tube at 875° C. into a second reaction chamber where oxidation could take place.

A 5% excess of preheated air was then mixed with the gaseous reaction mixture in the second reaction chamber and oxidation was completed at a temperature of 1000° C. to 1200° C. during a residence time of 2 seconds. This oxidation of the gaseous reaction mixture was effective in completing oxidation of the remaining reactants in the mixture.

EXAMPLE 3

1 Molar equivalent of chloroform was reacted with 10 moles of water vapor at 950° C. at 1 atmosphere of pressure in a first reaction chamber during a reaction time of 30 seconds. This reaction caused 99.9% dehalogenation of chloroform. This gaseous reaction mixture was then passed through an interfacing tube at 875° C. into a second reaction chamber where oxidation could take place. A 5% excess of preheated air was then mixed with the gaseous reaction mixture in the second reaction chamber and oxidation was completed at a temperature of 1000° C. to 1200° C. during a residence time of 2 seconds. This oxidation of the gaseous reaction mixture was effective in completing oxidation of the remaining reactants in the mixture.

The foregoing examples constituted laboratory feasibility tests, to establish effectiveness and residence times.

In carrying out the present invention at an effective production level, it is necessary to provide a reduction chamber suitably preheated to a reaction sustaining temperature.

In view of the advantages that obtain by use of hydrogen, as previously set forth, and the imperative need to provide an effective gaseous purge, the preheating of the subject vessel is preferred by way of passive heating means, such as electrical heating elements, as opposed to active heating methods, such as gas combustion. Owing to the highly active chemicals generally evolved from the subject process, the use of protective, chemically resistant vessel linings is important. This requirement and the use of radiant heat are not incompatible.

The use of steam or superheated steam as both a purge gas and as the pre-heating agent, is contemplated.

The present invention thus provides a system for the reduction and subsequent oxidation of organic waste materials, the system having a reducing vessel for the chemical reduction of the waste materials therein, first gas entry means for admitting a purge gas within the vessel in air purging relation thereto, to provide an oxygen-free environment within the vessel; preheating means for raising the temperature within the vessel above a predetermined minimum reduction temperature for a predetermined group of the organic waste material; feed means for feeding the organic waste material in a feedable form into the vessel within a localized mixing zone therein; fluid admission nozzle means for admitting a reducing fluid in directed intimate mixing relation with the waste material in the mixing zone, whereby the waste material is effectively reduced to a form including combustible gaseous components therewith.

The system further provides a combustion chamber to receive the combustible gaseous products for combustion therein.

In one embodiment, the combustion chamber is superposed over the reduction vessel, to receive the gases therefrom in upward flowing relation, through a central passage, equipped with a ceramic fire stop to prevent flash back. The hot reduced gas is introduced into the oxidation zone through a combustion mantle, combustion nozzles or other suitable apparatus to promote mixing with the combustion air being admitted to the oxidation zone, and provide optimal positioning of the flame front within the oxidation chamber.

The system further provides flue gas treatment means to handle the highly acidic flue gas by way of an alkaline scrub down, prior to release to the atmosphere.

A control system, not forming a part of the present invention, provides an automated control, in order to monitor and maintain appropriate feed rates of the process constituents, and safe and suitable environmental conditions for the respective stages of the process.

BRIEF DESCRIPTION OF THE DRAWINGS

Certain embodiments of the invention are described, reference being made to the accompanying drawings, wherein.

DETAILED DESCRIPTION OF THE PREFERRED EMBODIMENTS

Figure 1:
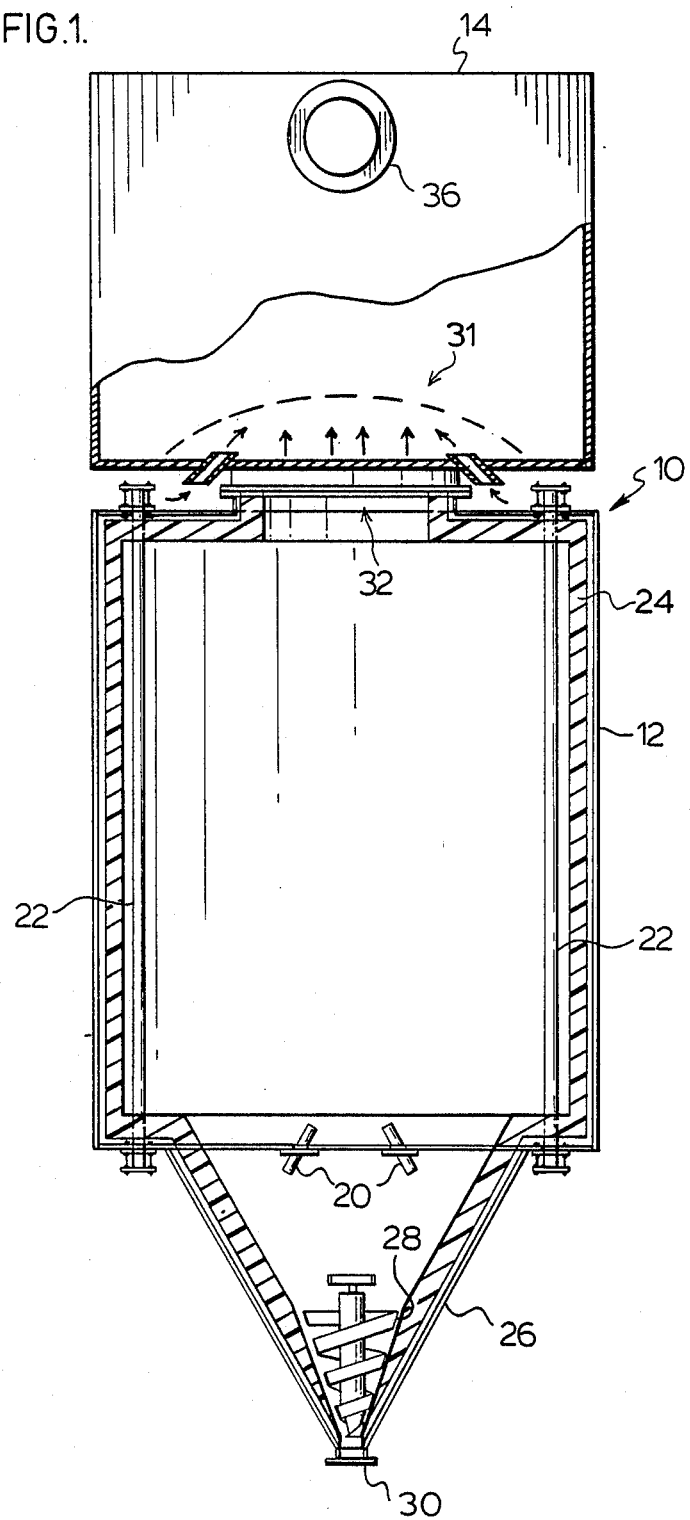
FIG. 1 is a schematic elevation, in diametrical section, of a reduction chamber; combined with a combustor, shown partly sectioned.

Referring to FIG. 1, the reduction vessel 10 for carrying out the subject process has a metal shell 12 and is substantially free-standing, having a combustion chamber 14 mounted thereon.

The reduction vessel 10 has one or more inlet nozzles 20 (see FIG. 2) for injecting waste, including pulverized solids, for atomization of the liquid portion thereof by jets of hydrogen gas through an annulus of nozzles 27.

The vessel 10 has a bank of radiant electrical heaters 22 of known commercial type such as Carborundum silicon carbide glow bar heaters lining the walls thereof. Chemically resistant FIBERFRAX (TM) ceramic thermal insulation 24 protects the shell 12, while also ensuring a safe working thermal environment in the locality of the vessel 10.

A bottom portion 26 of shell 12 includes an auger 28, and a sealed outlet 30 whereby cleaning out of solid inorganic residues can be effected.

A passage 32 connects vessel 10 with vessel 14 for upward passage therethrough of the reduced gaseous products. The passage 32 is positioned and sized to allow the pressure within vessel 10 to be controlled, in order to ensure a safe, positive pressure differential between reduction chamber 10 and combustion chamber 14. A blow-out panel (not shown) safeguards the vessel 10 against explosive over pressure.

An air supply nozzle and combustion grid combination 31 ensures safe and stable combustion within chamber 14.

Figure 2:
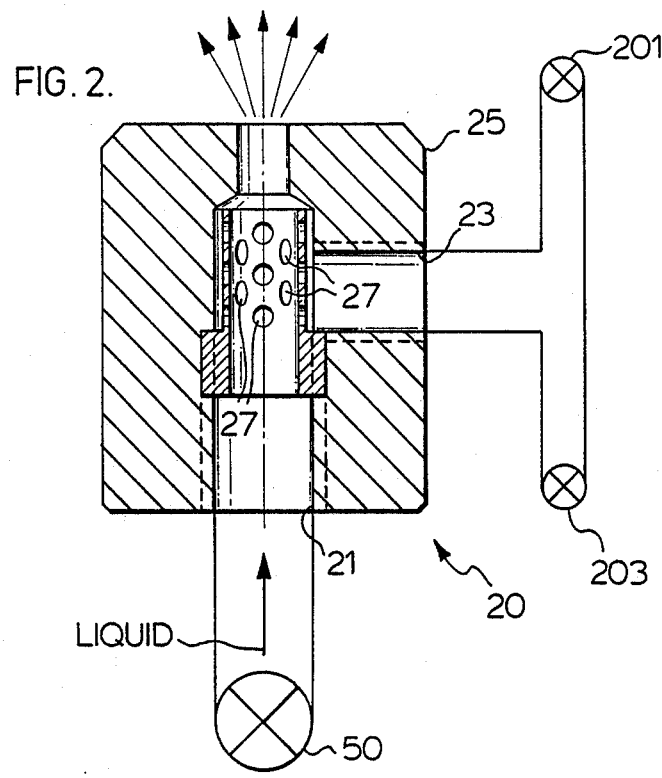
FIG. 2 is a scrap view, in diametrical section, of an atomizing nozzle portion of the reduction apparatus.

Referring to FIG. 2, the nozzles 20, positioned as shown in FIG. 1, each have a liquid inlet 21 and a gaseous inlet 23. The gaseous inlet 23 connects, by way of control valves 201, 203 with respective pressurized nitrogen and pressurized hydrogen supplies (not shown), for use in initially purging the combined vessel 10/14, and for subsequently operating the chemical reduction process, respectively.

The exhaust opening 36 of chamber 14 connects with an acidic gas scrubber and centrifugal fan or particulate removal apparatus 61, particularly in view of the hydrogen chloride content of the exhaust gases.

Figure 3:
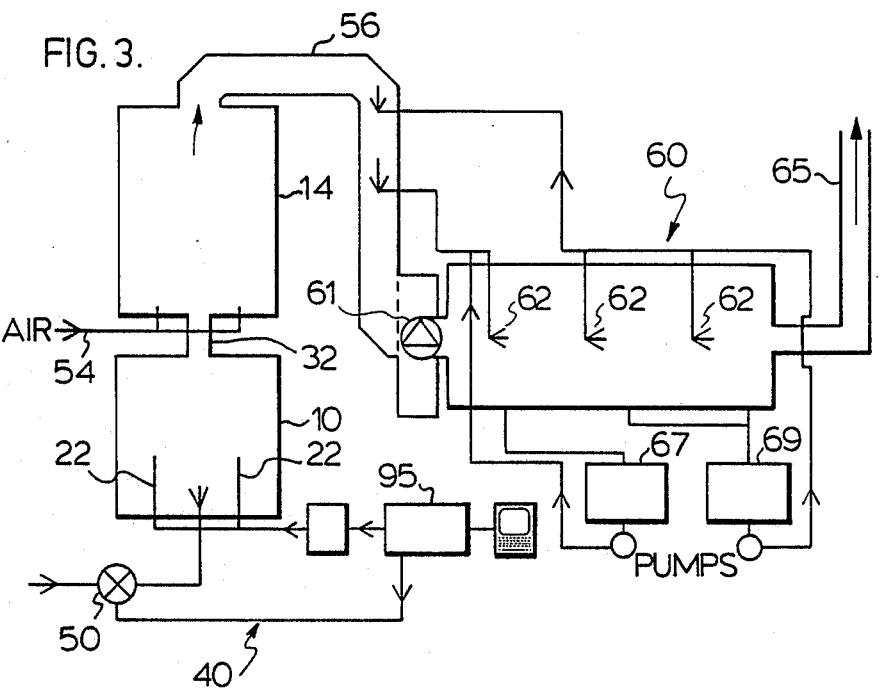
FIG. 3 is a diagramatic arrangement of a plant for carrying out the process.

Referring to FIG. 3, the system 40 is shown schematically, with reduction chamber 10 supporting combustion chamber 14. Feed of waste-with-liquid or liquids such as PCB or PCB-containing sludge is fed by way of a controllable feed valve 50 to the inlets 21 of the nozzles 20 in chamber 10. The reduced gases pass by way of passage 32 to combustion chamber 14. Variable air inlet controls 54 permit regulation of combustion chamber 14, operating substantially at atmospheric pressure.

Exhaust gases leave by way of passage 56, passing through a scrubber system 60 centrifugal fan particulate removal apparatus 61, and cooling showers, shown schematically at 62, to leave by stack 65, to atmosphere. The subject system includes neutralizing water tank 67, cooling water tank 69, and associated pumps and controls.

The overall system does not preclude other types of scrubbers.

Figure 4:
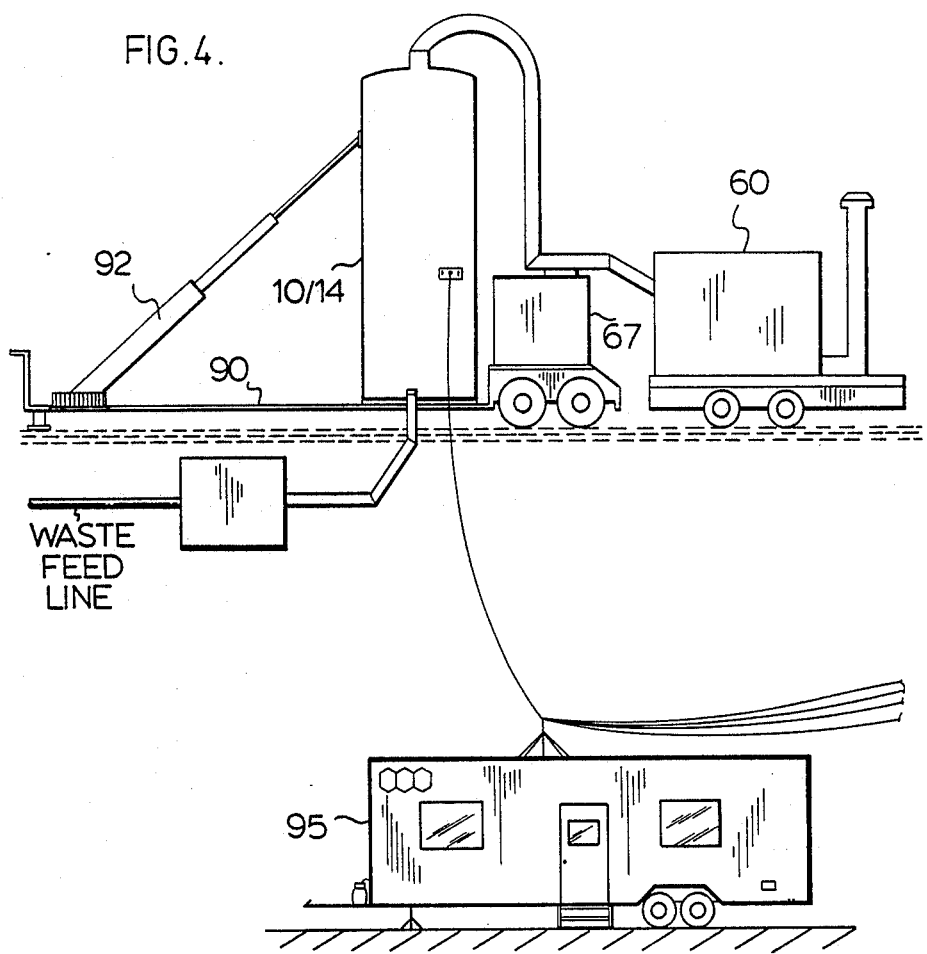
FIG. 4 is an impression of a mobile plant embodiment.

FIG. 4 is an artist's impression of the system as set up as a low-bed trailer 90, having a hydraulic actuator 92 for positioning the composite reduction/combustion vessel 10/14.

It is contemplated that steam from a steam generator may be utilized, both as the purging agent for the combined vessel 10/14, and as the pre-heating agent for the reduction and combustor chambers 10/14.

Process control instrumentation located in ancilliary trailer 95 provides automated control and back-up by way of instrumentation and controls (not shown).

In order to improve the economics of the operation it is contemplated to pass the high temperature exhaust gases through a suitable gas turbine power section (i.e. without combustors), connected in driving relation with an alternator, to generate useful electrical power, for sale to a local utility, and also to supply the power needs of the process, once start-up has been effected.

I claim:

1. A process for the destruction of organic waste material which comprises subjecting said waste material to direct reduction by intimate mixture with a gaseous reducing agent at a temperature above about 600° C. within an isolated first zone, wherein the hot reaction mixture thus obtained is at a temperature in the range of from about 800° C. to about 900° C.; transferring the thus reduced gaseous components to a second zone, and thereafter subjecting the hot reaction mixture thus obtained to oxidation with a gaseous oxidizing agent at a temperature above about 1000° C.

2. A process for the destruction of organic waste materials containing organic compounds selected from the group consisting of halogenated biphenyls, halogenated benzenes, halogenated phenols, halogenated cycloalkanes, halogenated alkanes, halogenated dioxins, halogenated dibenzofurans and mixtures thereof, which comprises subjecting said waste material to direct reduction by intimate mixture with a gaseous reducing agent at a temperature above about 600° C. over a residence time of about 30 seconds within an isolated first zone; transferring the thus reduced gaseous components to a second zone, and thereafter subjecting the hot reaction mixture thus obtained to oxidation with a gaseous oxidizing agent at a temperature above about 1000° C.

3. A process for the destruction of organic waste material containing organic compounds selected from the group consisting of halogenated biphenyls, halogenated benzenes, halogenated phenols, halogenated cycloalkanes, halogenated alkanes, halogenated dioxins, halogenated dibenzofurans and mixtures thereof, which comprises subjecting said waste material to direct reduction by intimate mixture with a gaseous reducing agent at a temperature above about 600° C. within an isolated first zone; transferring the thus reduced gaseous components to a second zone, and thereafter subjecting the hot reaction mixture thus obtained to oxidation with a gaseous oxidizing agent over a residence time of about 2 seconds at a temperature above about 1000° C.

4. A process for the destruction of organic waste material which comprises subjecting said waste material to reduction with a gaseous reducing agent at a temperature of from about 700° C. to about 900° C., said reduction being effected over a residence time of from about 5 seconds to about 40 seconds and thereafter subjecting the hot reaction mixture thus obtained to oxidation with a gaseous oxidizing agent at a temperature of from about 1000° C. to about 1400° C., said oxidation being effected over a residence time of from about 1 second to about 4 seconds.

5. The process of claim 4 wherein said reduction is carried out with a gaseous reducing agent in the presence of a metal catalyst selected from the group consisting of iron, nickel, zinc and tin catalysts.

6. A process for the destruction of organic waste material, which comprises: purging an isolated first zone of oxygen-containing gases; subjecting said organic waste material to direct reduction by intimate mixing with gaseous hydrogen at a temperature above about 600° C. within said first zone, transferring the reduced gaseous components to a second zone, and thereafter subjecting the hot reaction mixture thus obtained to oxidation with a gaseous oxidizing agent at a temperature above about 1000° C.

7. The process of claim 6 wherein said first zone is operated on a continuous basis at an elevated pressure.

8. The process of claim 6 wherein the reduction is carried out at a temperature of from about 800° C. to about 900° C.

9. The process of claim 6 wherein the waste material is subjected to reduction within said first zone over a residence time greater than about 5 seconds.

10. The process of claim 9 wherein said residence time is from about 15 seconds to about 45 seconds.

11. The process of claim 10 wherein said residence time is about 30 seconds.

12. A process for the destruction of organic waste material which comprises subjecting said waste material to reduction with a gaseous reducing agent in the presence of a metal catalyst at a temperature of from about 700° C. to about 900° C., said reduction being effected over a residence time of from about 5 seconds to about 40 seconds and thereafter subjecting the hot reaction mixture thus obtained to oxidation with a gaseous oxidizing agent at a temperature of from about 1000° C. to about 1400° C., said oxidation being effected over a residence time of from about 1 second to about 4 seconds.

13. The process as set forth in claim 12 wherein said metal catalyst is selected from a group consisting of iron, nickel, zinc and tin catalysts and mixtures thereof.

14. The process of claim 12 wherein the waste material is subjected to oxidation over a residence time of about 2 seconds.

15. A process for the destruction of organic waste material which comprises: subjecting said waste material to direct chemical reduction, by initial direct intimate mixing with a gaseous reducing agent; subsequent reduction at a temperature above about 600° C. within an oxygen-free isolated first zone, transferring the thus reduced gaseous components to a second zone, and thereafter subjecting the hot reaction mixture thus obtained to oxidation with a gaseous oxidizing agent at a temperature above about 1000° C.

16. A process of claim 15 wherein the gaseous reducing agent is selected from hydrogen, ammonia, natural gas, methane, propane, or water vapor, or a mixture of said agents.

17. The process of claim 15 wherein the reduction is carried out at a temperature of from about 600° C. to about 1100° C.

18. The process of claim 15 wherein the reduction is carried out at a temperature of from about 700° C. to about 900° C.

19. The process of claim 15 wherein the reduction is carried out at a temperature of from about 800° C. to about 900° C.

20. The process of claim 15 wherein the waste material is subjected to reduction within said first zone over a residence time greater than about 5 seconds.

21. The process of claim 15 wherein the waste material is subjected to reduction over a residence time of about 30 seconds.

22. The process of claim 15 wherein the reduction is carried out with a gaseous reducing agent in the presence of a metal catalyst.

23. The process of claim 15 wherein the hot reaction mixture thus obtained is at a temperature of from about 600° C. to about 1000° C. prior to oxidation.

24. The process of claim 15 wherein the hot reaction mixture thus obtained is at a temperature of from about 800° C. to about 900° C. prior to oxidation.

25. The process of claim 15 wherein the gaseous oxidizing agent is air or oxygen.

26. The process of claim 15 wherein the oxidation is carried out at a temperature of from about 1000° C. to about 1500° C.

27. The process of claim 15 wherein the oxidation is carried out at a temperature of from about 1200° C. to about 1400° C.

28. The process of claim 15 wherein the hot reaction mixture is subjected to oxidation with a gaseous oxidizing agent over a residence time of about 2 seconds.

29. The process of claim 15 wherein the organic waste material is in the form of a liquid, a pumpable sludge, a fine particulate slurry, pulverized solid material, an aqueous sediment or shredded or particulate organic solid material.

30. The process of claim 15 wherein the organic waste material contains halogenated or non-halogenated organic compounds.

31. The process of claim 15 wherein the organic waste material contains organic compounds selected from the group consisting of chlorinated biphenyls, chlorinated benzenes, chlorinated phenols, chlorinated cycloalkanes, chlorinated alkanes, chlorinated dioxins, chlorinated dibenzofurans and mixtures thereof.

32. The process of claim 15 wherein the gaseous reducing agent is hydrogen.

33. The process of claim 32 including the prior step of purging at least said first zone of oxygen-containing gases.

34. The process of claim 33 wherein said first zone is operated on a continuous basis at an elevated pressure.

35. The process of claim 15 wherein the waste material is subjected to reduction over a residence time of from about 15 seconds to about 45 seconds.

36. The process of claim 35 wherein the metal catalyst is selected from the group comprising iron, nickel, zinc or tin catalyst, or mixtures thereof.

37. The process of claim 35 wherein the metal catalyst is iron filings, powdered zinc, powdered nickel or powdered tin.

38. The process of claim 15 wherein said intimate mixture takes place utilizing a nozzle, said waste material being mixed in turbulent mixing relation with said gaseous reducing agent.

39. The process of claim 38 wherein said waste material is pumped in fluent form as a liquid, a pumpable sludge, a fine particulate slurry, pulverised solid material, an aqueous sediment or shredded or particulate organic solid material.

40. The process of claim 39 wherein said gaseous reducing agent impinges in convergent impacting relation with said fluent waste material.

41. The process of claim 15 wherein the organic waste material contains organic compounds selected from the group consisting of halogenated biphenyls, halogenated benzenes, halogenated phenols, halogenated cycloalkanes, halogenated alkanes, halogenated dioxins, halogenated dibenzofurans and mixtures thereof.

42. The process of claim 41 wherein the gaseous reducing agent is hydrogen, ammonia, natural gas, methane, propane or water vapor, or a mixture of said agents.

43. The process of claim 41 wherein the gaseous oxidizing agent is air or oxygen.

44. The process of claim 41 wherein the waste material is subjected to reduction over a residence time of about 30 seconds.

45. The process of claim 41 or 12 wherein the waste material is subjected to oxidation over a residence time of about 2 seconds.

* * * * *